United States Patent [19]
McAlister

[11] Patent Number: 5,394,852
[45] Date of Patent: Mar. 7, 1995

[54] METHOD AND APPARATUS FOR IMPROVED COMBUSTION ENGINE

[76] Inventor: Roy E. McAlister, 216 S. Clark #103, Tempe, Ariz. 85281

[21] Appl. No.: 755,323

[22] Filed: Sep. 5, 1991

Related U.S. Application Data

[63] Continuation-in-part of Ser. No. 364,309, Jun. 12, 1989, abandoned.

[51] Int. Cl.$^6$ ............................................. F02M 51/00
[52] U.S. Cl. ................................. 123/494; 123/435; 123/527; 60/309
[58] Field of Search ............... 123/DIG. 12, 3, 494, 123/497, 435, 527; 60/309; 73/119 A

[56] References Cited

U.S. PATENT DOCUMENTS

| | | | |
|---|---|---|---|
| 3,682,142 | 8/1972 | Newkirk | 60/309 |
| 4,099,489 | 7/1978 | Bradley | 123/DIG. 12 |
| 4,442,801 | 4/1984 | Glynn et al. | 123/DIG. 12 |
| 4,918,916 | 4/1990 | Tiberg | 60/309 |
| 4,971,009 | 11/1990 | Washino et al. | 123/435 |
| 5,153,834 | 10/1992 | Abo et al. | 123/435 |
| 5,183,011 | 2/1993 | Fujii et al. | 123/DIG. 12 |
| 5,218,941 | 6/1993 | Suzuki et al. | 123/478 |
| 5,222,481 | 6/1993 | Morikawa | 123/435 |

*Primary Examiner*—E. Rollins Cross
*Assistant Examiner*—Erick Solis

[57] ABSTRACT

A process for operating a combustion engine which comprises the steps of thermoelectrochemiclly regenerating waste heat rejected by the combustion engine by adding waste heat to an electrolysis cell, generating hydrogen by an amount of electricity that is reduced as a result of additions of waste heat and using the hydrogen as a stratified-charge combustant within each combustion chamber of the engine.

7 Claims, 7 Drawing Sheets

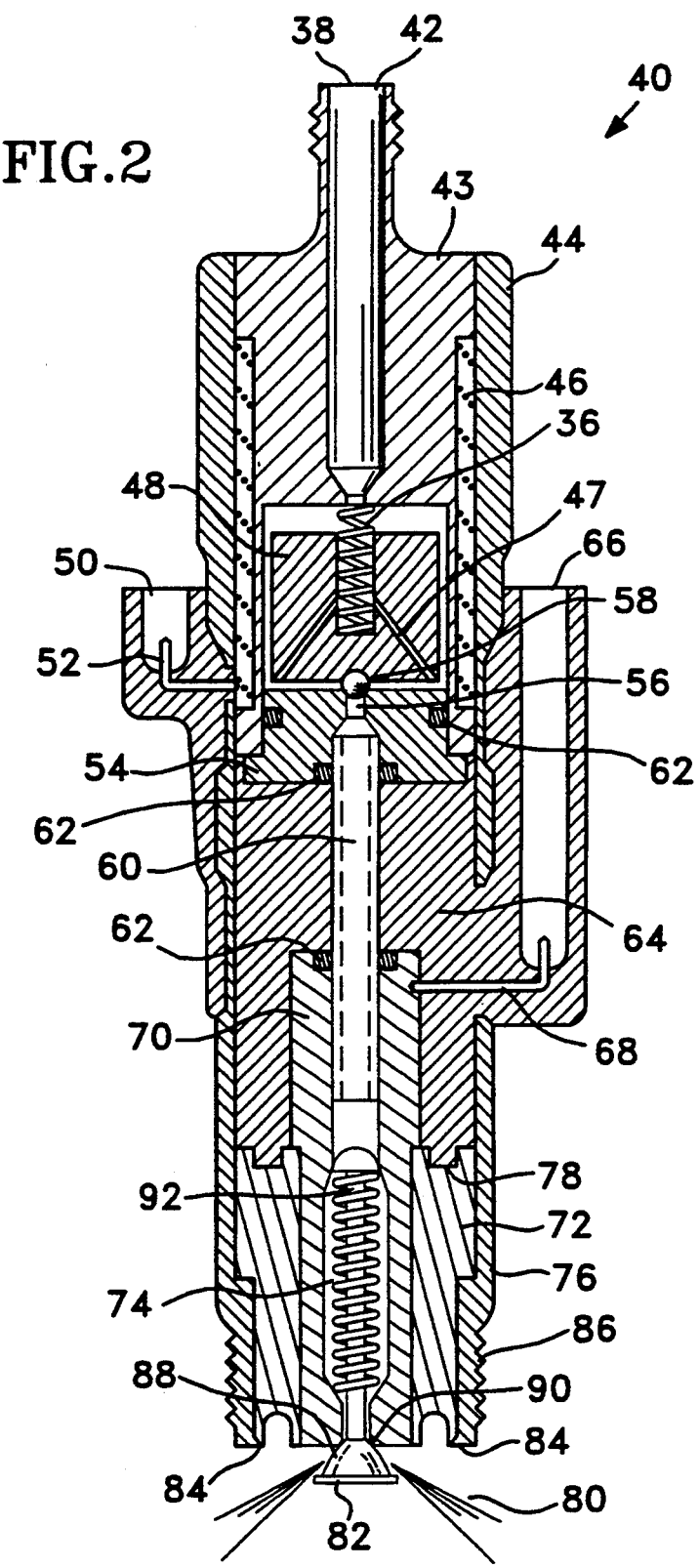

METHOD AND APPARATUS FOR IMPROVED COMBUSTION ENGINE

This invention relates to improved operation of internal combustion engines. This application is a continuation-in-part of Ser. No. 07/364,309, filed Jun. 12, 1989, now abandoned. The specification of Ser. No. 07/364,309, is incorporated herein as if it were repeated entirely.

Objects of the invention in addition to those previously stated include those of the following summary.

SUMMARY OF THE INVENTION

An object of the present invention is to provide method, apparatus, and a process for monitoring and characterizing the condition of each combustion chamber of a combustion engine.

An object of the present invention is to provide a process for monitoring and characterizing direct fuel injection into a combustion chamber.

An object of the present invention is to provide a process for monitoring and characterizing the ignition and combustion of fuel that has been injected into a combustion chamber.

An object of the present invention is to provide rapid fail safe operation of a combustion engine.

An object of the present invention is to optimize fuel delivery, combustion, and power development of a combustion engine.

An object of the present invention is to collect water from the exhaust stream and convert the water to hydrogen for use as a fuel.

An object of the present invention is to produce hydrogen by electrolysis for use as a fuel in a combustion engine.

An object of the present invention is to convert kinetic energy of a vehicle into chemical energy by generating electrolytic hydrogen as the vehicle is slowed.

An object of the present invention is to convert waste heat from a combustion engine to chemical energy. An object of the present invention is to facilitate the use of clean renewable electricity in existing vehicles using combustion engines.

An object of the present invention is to use utility electricity to produce hydrogen for start-up and clean operation of vehicles in areas that are sensitive to air pollution.

An object of the present invention is to safely store and regulate the delivery of hydrogen on board a vehicle.

BRIEF DESCRIPTION OF THE DRAWINGS

FIG. 2 is a longitudinal sectional view of a device constructed in accordance with the principles of the present invention for directly injecting and igniting fuel in the combustion chamber of an engine.

DESCRIPTION OF THE PREFERRED EMBODIMENT

Figure 1:
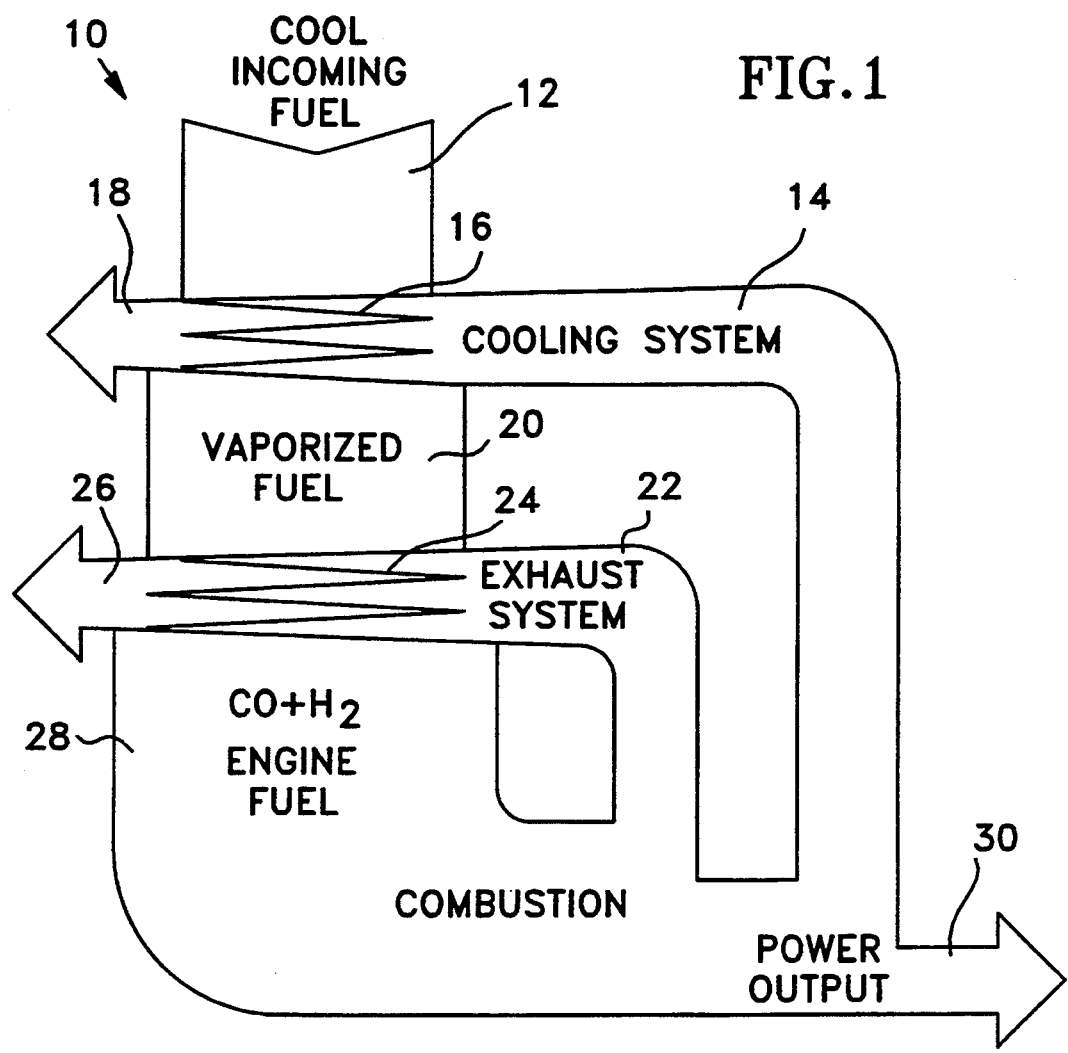
FIG. 1 is a schematic illustration showing thermodynamic processes of the invention.
Figure 4:
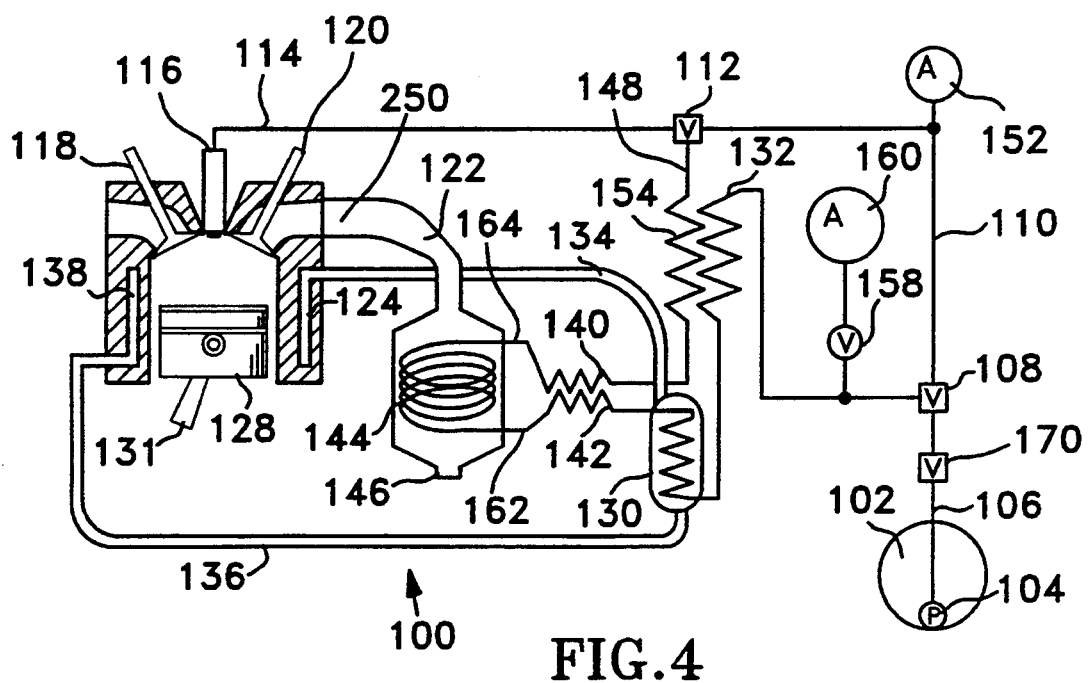
FIG. 4 is a schematic circuit diagram of the invention showing a sectional view of a representative combustion chamber, a cooling system, an exhaust system, fuel storage, fuel pressurization, a cooling system, waste heat recovery exchanger, an exhaust heat recovery exchanger, and delivery of engine-fuel to the combustion chamber.
Figure 3:
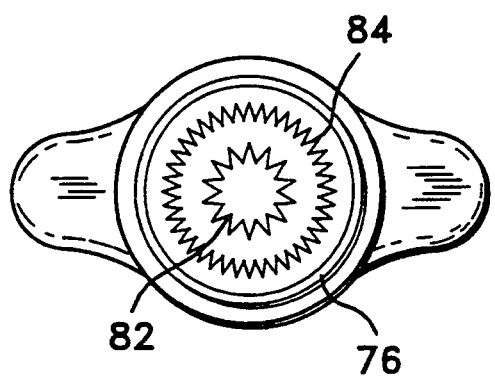
FIG. 3 is an end view of the device of FIG. 2 showing an embodiment of ignition electrodes constructed in accordance with the principles of the invention.
Figure 5:
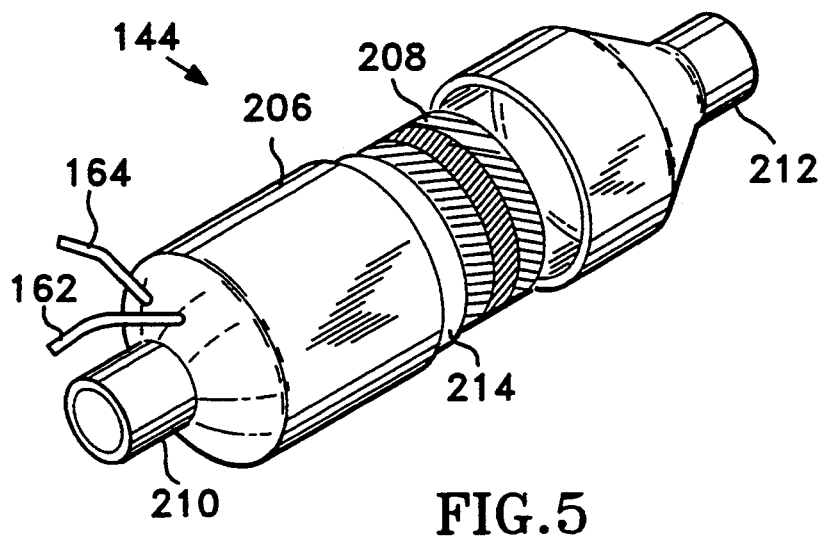
FIG. 5 is a perspective view of apparatus for recovering exhaust heat to be used to drive endothermic reactions between fuel and an oxygen donor.
Figure 6:
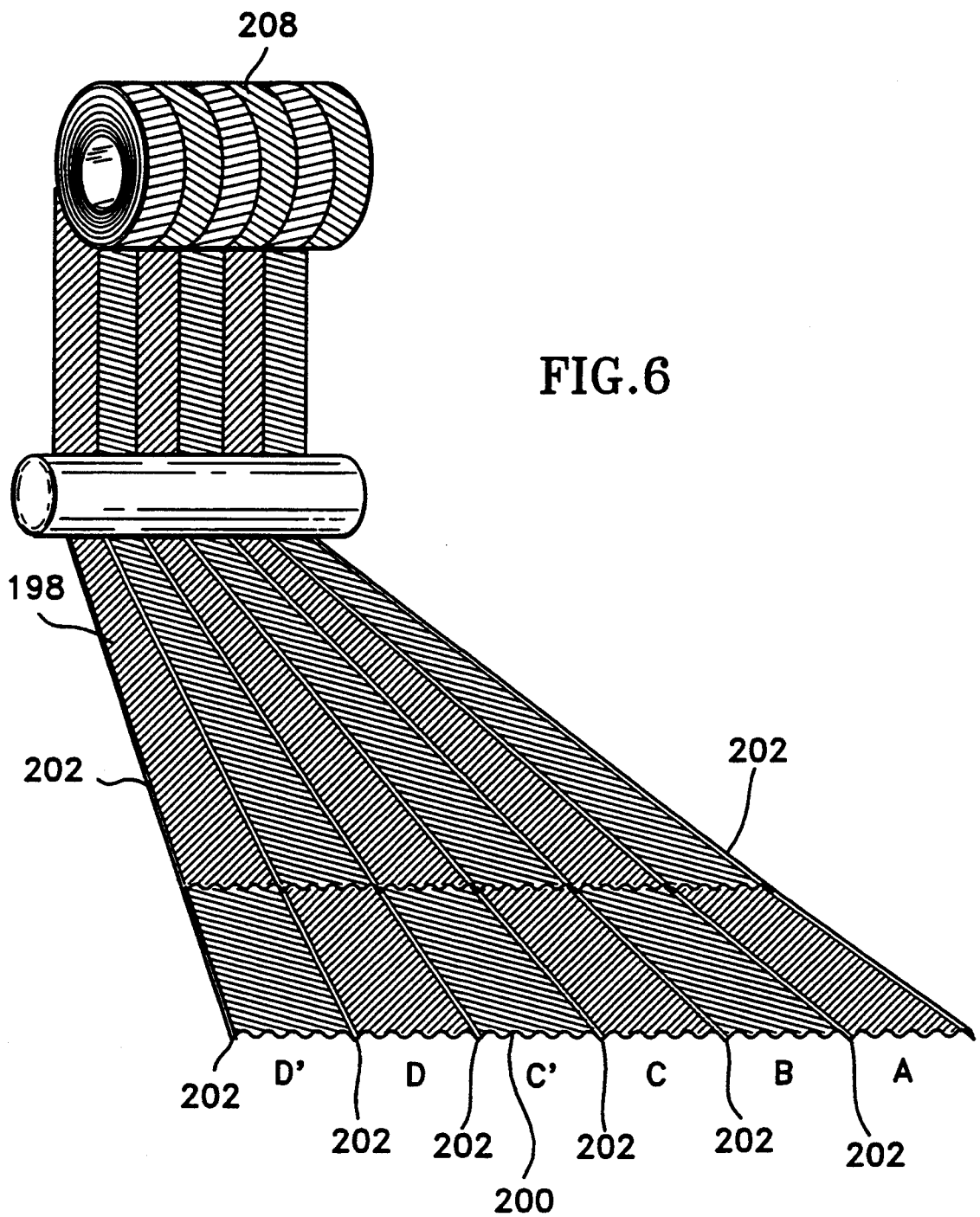
FIG. 6 is a schematic view of details of a preferred heat exchanger tube-fin fabrication technique utilized in accordance with the principles of the present invention.

In my pending application of Ser. No. 07/364,309 as disclosed particularly on pages 14–18, direct injection and ignition of entering fuel is preferably accomplished by the apparatus disclosed with respect to FIGS. 2 and 3.

Removal of the ceramic tube 60 shown in FIG. 2 allows polymer dielectric 64 to transmit greater force as a result of pressure differences between the pressure within the bore where ceramic tube 60 was located and the ambient pressure outside wall 76. The radial force transmitted to wall 76 by dielectric 64 is met by an equal and opposite force by surrounding steel wall 76 to contain the assembly.

Figure 9:
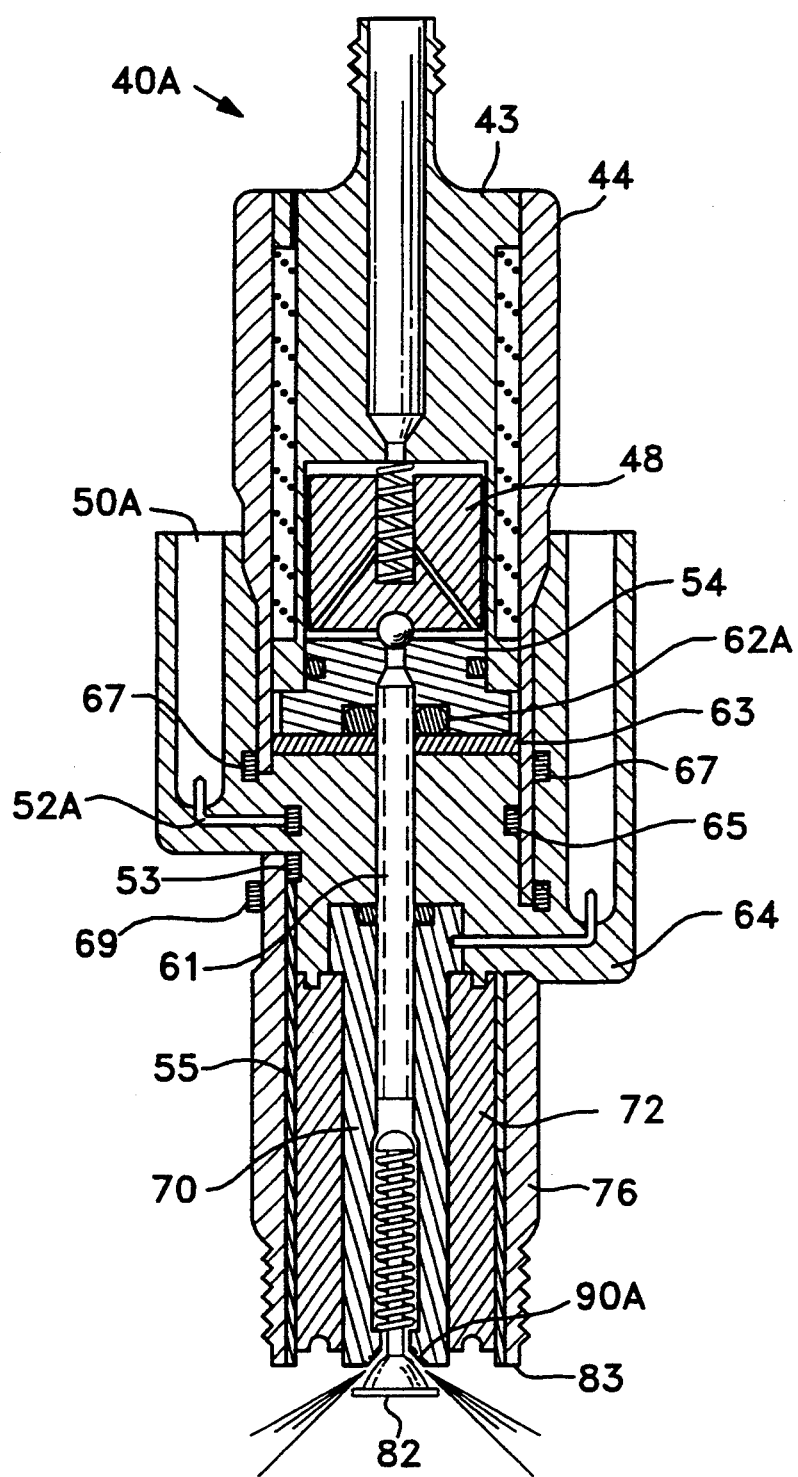
FIG. 9 shows a longitudinal sectional view of a device constructed in accordance with the principles of the present invention for directly injecting and igniting fuel in the combustion chamber of an engine and for monitoring these events.

Removal of ceramic tube 60 and replacement with lower modulus tube 61 as shown in FIG. 9 also allows polymer dielectric 64 to transmit greater force to valve seat 54 as a result of pressure differences between the compression chamber beyond dielectric 72 and valve seat 54. By providing a force or "pressure" transducer 63 or 65 between valve seat 54 and dielectric polymer 64, fuel injection and other events of engine operation can be instrumented. This aspect of the invention is shown in FIG. 9. Especially useful pressure transducers for this purpose are strain gages and piezoelectrics including ceramics such as quartz and barium titanate, and polymers such as polyvinylidine fluoride (PVDF). O-ring 62 in valve seat 54 can be made of such material to perform both sealing and pressure transducer functions. Deformation of the o-ring material produces a voltage signal that can be monitored to determine fluid pressure within the passage way from valve seat 54 to nozzle 70. Axial force resulting from pressure variations in the combustion chamber is also indicated by piezoelectric o-ring 62 in valve seat 54.

Figure 10:
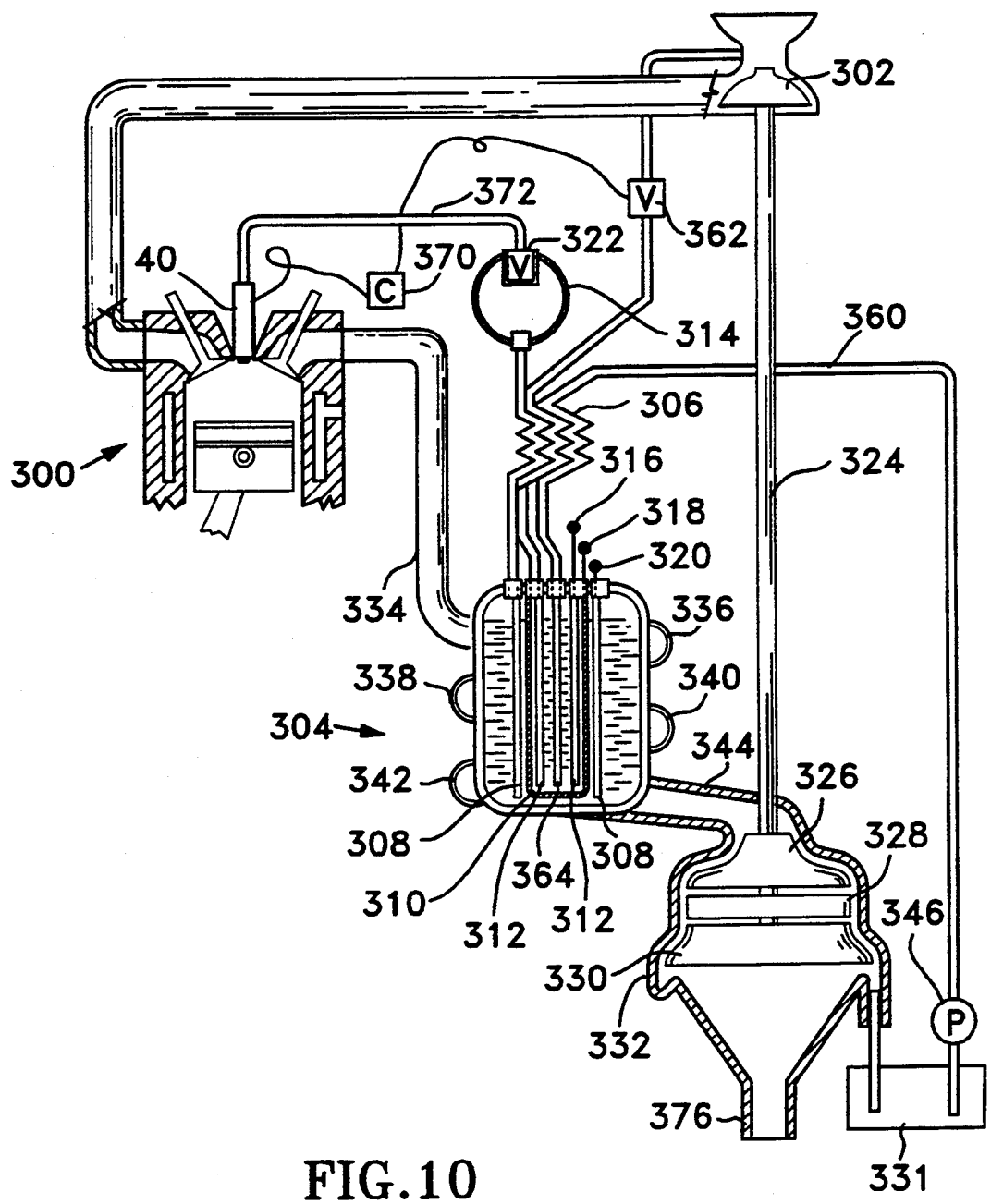
FIG. 10 shows a schematic view of a combustion engine constructed in accordance with the principles of the present invention for producing hydrogen by electrolyzing water and using the hydrogen in accordance with the principles of the invention.

Masking o-ring 62 and metallizing with conductive ink or by sputtering NiCu electrode patterns on the surface of the o-ring allows the voltage signal to be taken out of the assembly by a suitable electrical cable to an external controller as shown at 370 in FIG. 10. Electrode patterns can be designed to emphasize the signal for fuel pressure monitoring or to emphasize the signal for combustion chamber pressure monitoring or it can be designed to monitor both activities.

For monitoring the fuel pressure signal it is preferred to provide a metallized electrode around the greatest or outside diameter of the o-ring and to provide another opposing electrode at the smallest or inside diameter. The piezoelectric force signal is taken from the outside electrode to a controller 370 outside of the fuel injector 40. It is preferred to make valve seat 54 of a suitable dielectric material such as sintered alumina or other ceramic material however it has been possible to coat metal valve seats with powder-coated and sintered dielectrics such as perfluoroalkoxy polymer to produce a dielectric coating sufficient to electrically isolate the pressure transducer signal.

In instances that emphasized monitoring of combustion chamber pressures is desired it is preferred to mask the o-ring for application of opposing electrodes on the areas that contact the face of dielectric 64 and the parallel face of the o-ring groove in valve seat 54. This arrangement emphasizes voltage production between the electrodes for axial forces due to combustion chamber pressures.

Another o-ring electrode pattern that has been found to be best for monitoring both fuel pressure and combustion chamber pressure is provided by applying the electrodes about half-way between the two locations described above. This provides substantial signal for fuel-injection and combustion-chamber events.

Such piezoelectric material (PVDF) is also available in various thicknesses and dimensions from Pennwalt Corporation, Valley Forge, Pa. 19482. It has been found that a PVDF disc 63 having the outside diametrical dimension of the bore of case 76 at the location of valve seat 54, an inside bore dimension of the o-ring gland as shown, and a thickness of about 50 micrometers serves well as a fuel-pressure and combustion-chamber monitor. It is preferred to apply electrodes to the faces that contact valve seat 54 and dielectric 64. If valve seat 54 is metallic and grounded by contact to case 72, a single insulated lead to an outside controller suffices for monitoring the pressure events of interest.

In the instance that a piezoelectric disk 63 is used it is preferred to select the material for making dielectric body 64 with sufficient Poisson displacement from forces exerted by fuel pressure to develop a substantial axial force and resulting piezoelectric signal on transducer disc 63. In this instance it is preferred to select a relatively low modulus of elasticity material such as unfilled ethylene tetrafluoroethylene rather than a stiffer material such as glass-filled polyphenylene sulfide.

Another suitable form of piezoelectric sensor is a right circular cylinder (65) located between cylindrical case 76 and dielectric 64. Cylindrical piezoelectric transducers are available in outside diameters of 0.25" to 1.00" with nominal wall thicknesses of 0.02" to 0.05" and in cylindrical lengths up to 12". Such devices are available from Atochem Sensors, P.O. Box 799, Valley Forge, Pa. 19482. In this instance the pressure transmitted from fuel passing through tubular space 60 causes piezoelectric 65 to generate an electrical signal. Pressure rise in the combustion chamber is transmitted through component assembly 70, 72, and 64 to generate another type of piezoelectric signal on transducers such as 62A, 63 and 65. This allows monitoring the combustion chamber to determine operating conditions such as intake, compression, power and exhaust. Determining the approach to top dead center and the trend in piston speed as a result of fuel injection and ignition characteristics allows rapid optimization of fuel-injection and spark-ignition. This approach to pressure measurement and characterization of piston speed, fuel injection, ignition, and combustion provides much more comprehensive control and optimization of the engine than conventional approaches of control instrumentation.

In operation, force transducer 63, force-detecting o-ring 62A, or transducer 65 67, and 69 are monitored by connection of one of the electrodes to a suitable electrical circuit through a suitable connection such as 52A for determining the occurrence of piezoelectric signal.

Other suitable pressure transducers for determining the pressure condition of combustion chambers served by the combination fuel injector and spark ignition device of FIG. 10 include:

1. Fiber optic devices in which an interferometric cavity resonator is located between the end face of an optical fiber and a thin reflective silicon wafer chip. The chip acts as a diaphragm and flexes with differential pressure or with motion of surrounding materials that deform as a result of pressure within the fuel conduit and due to pressure within the combustion chamber. This flexing of the diaphragm changes the cavity depth as a function of the diaphragm's radius and modifies the overall spectral reflectance of the light relative to the pressure. Any of four basic variables of intensity, frequency, phase, or polarization may be selected to sense pressure by this fiber optic instrumentation. Intensity modulation is a simple illustration in which the total intensity of reflected light indicates the pressure of the fuel conduit and the combustion chamber. A suitable source for such a device is Fiber Optic Sensor Technologies of Ann Arbor, Mich.

2. Polysilicon piezoelectric gage elements bonded by chemical vapor deposition or molecular bond adhesion to a temperature matched substrate such as tube 60 of FIG. 2, or to the face of seat 54. Such devices are available from Rosemount, Inc. of Eden Prairie, Minn., and from Dresser/Ashcroft of Stanford, Conn.

3. Capacitance sensors with two-way transmitters using fiber optics, smart, or fieldbus communications. All versions use a microcapacitance silicon sensor. Such devices are available from Fuji Instruments, Ltd. of Toko, Japan.

4. Ceramic diaphragms may be used in capacitance pressure sensors. Pressure sensors of this type are suitable and are available from Endress+Hauser Instruments of Greenwood, Ind.

5. Tuning fork instrumentation to determine pressure as a change of frequency is suitable and such pressure transducers measure the natural frequency with piezoelectric elements. Such devices are available from Yokogawa Corporation of America in Newman, Ga.

6. Fiber optic devices in which the intensity of reflected light is modified by a pressure deformable metallized mirror. The end of the fiber is fitted with a diaphragm having a reflective surface that acts as a variable reflector. The diaphragm flexes with differential pressure or with motion of surrounding materials that deform as a result of pressure within the fuel conduit and due to pressure within the combustion chamber. This flexing of the diaphragm changes the amount of reflected light as a function of the diaphragm's radius and modifies the overall spectral reflectance of the light relative to the pressure.

In operation, light pipe tubing 55 conveys combustion chamber optical information to a photo-electronic device 53 and pressure signals selected from the foregoing group including cylindrical piezoelectric or capacitance transducers 63, 65, 67, or 69 to develop signals measuring and monitoring combustion chamber events and in response to pressurize increases within bore 60 as fuel passes to the combustion chamber. Detection and characterization of this fuel flow is an important diagnostic step in assuring precisely timed delivery of the fuel to the combustion chamber and in optimization of engine control. Combustion chamber events including intake, compression, stratified-charge fuel introduction, ignition, combustion, and expansion are monitored by one or more pressure transducers 62A, 63, 65 67 or 69. It is preferred to control some engines with a behavior-based approach such as the Neuronal Group Selection disclosed by Wade O. Troxell in "A Robotic Assembly Description Language Derived from Task-achieving Behaviors" Proceedings, Manufacturing International '90. Atlanta, March 1990; and by Tim Smithers and Chris Malcolm in "Programming robotic assembly in terms of task achieving behavioral modules" DAI Research Paper No. 417, Edinburgh University, Department of Artificial Intelligence, 1988; and by D. B. Killelson, M. J. Pipho, and J. L. Franklin in "Dynamic Optimization of Spark Advance and Air-Fuel Ratio for a Natural Gas Engine" SAE paper 892142 in SP-798 *Gaseous Fuels: Technology and Emissions*, Society of Automotive Engineers, 1989. These references being incorporated herein. High speed engines driving lawn mowers, motor cycles, and hand tools that undergo rapid changes in speed and load are examples of instances where dynamic optimization is preferred.

Advantages of the invention are also beneficial in combination with more traditional Adaptive Control Techniques by providing a very fast analysis of operations and trends. This fuel-injection and combustion-chamber information provides a much more intimate and instantaneous picture of engine operation than previous instrumentation. With instantaneous information, extremely rapid adaptive control optimization occurs for fuel injection and ignition parameters such as delivery timing, pressure, and penetration pattern. These parameters can be managed by the engine controller to produce very high fuel efficiencies and minimal oxides of nitrogen by plasma ignition of entering fuel in fuel-rich mixtures followed by completion of combustion in far excess air conditions with the result being reduced peak combustion temperature, reduced oxides of nitrogen, and faster completion of combustion to fully oxidized products of combustion. Application of the invention with adaptive control techniques is preferred in engines that operate for long periods with relatively slow changes in load and speed conditions. Examples are locomotives, barges, and air planes in which the engines operate with relatively slow changes in load conditions and where two or more engines may be coupled to the same load and require speed matching.

Fuel flow is compared to the flow and combustion results in other combustion chambers and is varied to produce the maximum brake mean effective pressure for the least fuel consumption and least emissions of pollutants. In addition to optimization, the invention provides extremely rapid fail-safe monitoring to prevent damage to an engine due to a stuck open fuel control valve. For instance, if valve 48 should stick open the fuel pressure in 60 would be immediately detected and characterized as an abnormal event and the fuel supply could be shut down or brought to a reduced pressure by the controller in a small fraction of the time that conventional control systems require. Excess fuel flow would be detected before other conventional instrumentation could detect a speed change in the crank shaft. This is an extremely important safety-assurance feature.

In conventional control systems for electronic fuel injection a stuck-open fuel control valve in a multiple cylinder engine would go undetected at least until the crank shaft or cam shaft changed speed and probably for many revolutions before being detected. In the present invention it would be detected in the first abnormal fuel pressure occurrence and the controller could determine the optimal course of action to accomplish the desires of the operator for best safe performance. Corrective action would occur on the next combustion chamber ready for fuel injection, ignition, and power production.

Determination of discrepancies such as low fuel pressure are also provided by the present invention. Partial plugging of individual fuel filters for each embodiment 40 can be compensated by providing longer fuel flow times in such combustion chambers. This aspect of the invention provides compensation or correction of partially performing sub-systems long before a change in engine performance could be detected by conventional approaches. By directly injecting fuel into each combustion chamber correctional operation and maintenance of desired engine speed and torque production can be achieved much more rapidly than with previous approaches to fuel management in which homogeneous air/fuel mixtures are prepared in the intake system of the engine.

As provided in my application of Ser. No. 07/346,309, water is recovered from the exhaust stream of a combustion engine. This water can be electrolyzed to produce hydrogen. Any suitable electrolyzer may be used. For vehicles that need peak engine performance by utilization of as much exhaust energy as possible, the electrolyzer disclosed by J. F. McElroy in "SPE Regenerative Fuel Cells For Space and Marine Applications" pp. 282–285, Fuel Cell Seminar, November, 1990 is preferred. It is preferred to use the embodiment shown in FIG. 10 to reduce electrical energy requirements by recovery of waste heat. An excellent summary of electrolysis technology is found in the article "Intermediate Temperature Water Vapor Electrolysis" by M. Schriber, G. Lucier, J. A. Ferrante, and R. A. Huggins, Int. J. Hydrogen Energy, Vol. 16, No. 6, pp 373–378, 1991, and is incorporated herein.

In many vehicles approximately 50 percent of unwanted exhaust emissions occur at start-up and during cold engine conditions. Waste heat from a combustion engine usually exceeds the energy converted to shaft work. This waste heat can be used in elevated temperature electrolysis to reduce the electrical energy required for electrolysis. FIG. 10 shows an apparatus for elevated temperature electrolysis. In remote locations especially where water is scarce, it is preferred to use water in the electrolysis process that has been recovered from the exhaust stream of the combustion engine by embodiments such as those shown in FIGS. 7, 8, or 10. In instances that water is plentiful it is convenient to use water from the city water supply, from water wells, or from filtered sea water.

In operation of the embodiment of FIG. 10, a combustion engine 300 depicted generally as a piston engine as shown operates with a supply of air from inlet compressor 302. Following combustion, exhaust gases travel to electrolyzer 304 for purposes of heating the electrolyzer. Water from a suitable source is added to the electrolysis cell 304 after heat exchange in 306 with elevated temperature hydrogen and oxygen from electrolysis cell 304.

Elevated temperature electrolysis is carried out within 304 using direct current applied to electrodes 308 and 312. Semipermeable membrane 310 separates concentric chambers within which cylindrical electrodes 308 and 312 are located. An eutectic of NaOH and KOH salts provides a suitable electrolyte for the innermost chamber where water is added through tubes 360 and 364 and where concentric oxygen electrode 312 is located. The same electrolyte may be used in the outer chamber, however lithium hydride, potassium chloride, sodium chloride, and lithium chloride form suitable eutectic salt electrolyte for the surrounding chamber in which concentric hydrogen electrode 308 is loacated. Temperatures above about 350° F. and up to 1,000° F. (or the maximum exhaust temperature) are suitable for operating the electrolyzer. Suitable electrode materials are type 302 stainless steel for 312 and nickel screen for electrode 308. Membrane 310 can be made of any suitable proton or hydrogen ion permeable material including materials designed for electrodialysis such as those based on inorganic materials such as ceramics or metals that provide oxidation and hydrogen-embrittlement resistance. It is preferred to use a thin membrane of silver-palladium which serves as a common negative electrode to both electrodes 312 and 308 in instances that long life is mandatory. For automotive applications it is sufficient to use palladium coated iron-nickel and iron-manganese alloys such as the austenic steels.

Positive voltage is applied to each electrode 308 and 312 through lugs 320 and 316 as shown. Negative voltage is applied to lug 318. It is preferred to use several electrolyzers like the unit cell shown in series to provide a full load for a 12 volt system. Each electrolyzer unit cell requires about 1.1 to 1.5 volts depending upon the temperature of operation.

Electricity for operation of electrolyzer 304 may be generated by one or more on-board generators (not shown) or it may come from rectified utility grid power during times that the vehicle is parked at facilities for charging. It is preferred to use electricity generated by "braking" generators during times that the vehicle is decelerated. When the brakes are applied these generators develop electricity for electrolyzer 304. This provides recovery of vehicle kinetic energy as chemical potential energy for use when engine power is needed. Generators suitable for this purpose include the standard engine-driven alternators, driveline generators, and special generators in each wheel of the vehicle.

Hot hydrogen and oxygen exiting electrolyzer 304 are cooled by preheating entering water in heat exchanger 306 as shown. It is preferred to insulate electrolyzer 304 with high temperature rock wool or similar materials to keep inventories of electrolyte molten for hours after shut down of the engine. This provides for recovery of waste heat as chemical potential energy through elevated temperature electrolysis. Hydrogen is stored in pressure accumulator 314.

Storage pressure of hydrogen is determined by the pressure maintained by pump 346. This balances the pressure across membrane 310. Typical storage pressures are about 140 atmospheres. Regulation of hydrogen pressure to spark injector 40 is preferably accomplished primarily by solenoid valve 322 which is opened when the pressure is below a set point and closed when the pressure reaches a set point. Another conventional pressure regulator may be used in series if desired but it is preferred to use at least fail-safe regulator 322. It is preferred to locate pressure regulator 322 inside of accumulator 314 as shown so it cannot be impinged without destroying accumulator 314 and will fail safe in case of collision. If the vehicle is in a collision and the air bag or safety harness is activated, fail-safe valve 322 is returned to the normally-closed condition. Reactivation of pressure regulation requires action by the operator to signal that it is safe to continue fuel delivery to spark-injector 40. A suitable action would be to re-engage the starter switch or to reset a switch.

Using off-peak electricity to generate clean hydrogen transportation fuel is an especially opportune way for existing electric generating capacity to help solve the problem of air pollution. Off-peak wind, wave, falling-water and other forms of renewable electric power are especially desired for an embodiment of the invention that gets the car ready for daily use on hydrogen while the car is parked. The parked vehicle is manually or automatically coupled by contact wiring or inductive coupling to an electricity supply. Electrolyzer 304 is heated to by application of alternating electric current to electrodes 316/318 and 320/318 to develop the desired temperature.

After reaching the desired temperature, direct current is applied between electrodes 308 and 312 (positive) and 310 (negative). Pump 346 is activated to supply water from a suitable reservoir 33 to the center chamber through tube 360 as shown. Steam or water exiting from the circuit of tube 360 is distributed to the fused salt electrolyte by helical fin tube 364. Pump 346 is activated to maintain pressure equilibrium across 310 at the instantaneous hydrogen storage pressure. Normally open solenoid valve 362 is actuated to closed position and opened intermittently to maintain the instantaneous hydrogen storage pressure by allowing bleed off of oxygen as required. Hydrogen ions pass through membrane 310 and travel to electrode 308 where electrons are added to produce atomic hydrogen which combines to form diatomic hydrogen which is cooled in heat exchanger 306 and stored in accumulator 314.

It is preferred to bring the temperature of 304 to the upper limit of temperature while on parked charge so that when the vehicle starts operating it will be ready to accept conversion of stopping energy as stored hydrogen. This can be done by programming the parked vehicle charging system to charge the hydrogen accumulator to within about 10 percent of the maximum storage pressure as soon as the car is parked in order to take advantage of the heat accumulated in 304. A suitable programmable timer is a Grainger Stock No. 685. Near the expected end of the programmed park period the electrolyzer is reheated and the accumulator is charged to the design pressure to be ready for at least starting and warming the engine on hydrogen before introducing a fuel containing carbon. This mode of operation reduces unwanted exhaust emissions by up to 50 percent. For many motorists in stop and go traffic, the vehicle would be operated without the use of fossil fuels. This mode of operation reduces unwanted emissions by almost 100 percent.

It is preferred to operate the combustion engine with the special water-condensing turbocharger shown which consists of compressor 302, drive shaft 324, turbo-motor 326, stator 328, and turbo-motor 330. Steam and condensed water are collected in centrifugal separator 332 as shown. Exhaust gases delivered to 344 pass around electrolyzer 304 in a helical path as shown in section at, 336, 338, 340, and 342. Cooled exhaust gases finally exit to the atmosphere through 376. This provides heat to electrolyzer 304 and helps insulate 304. Final insulation (not shown) is placed on the outside of the assembly to conserve heat. It is preferred to use a vacuum jacketed insulation system like the venerable thermos bottle.

Figure 7:
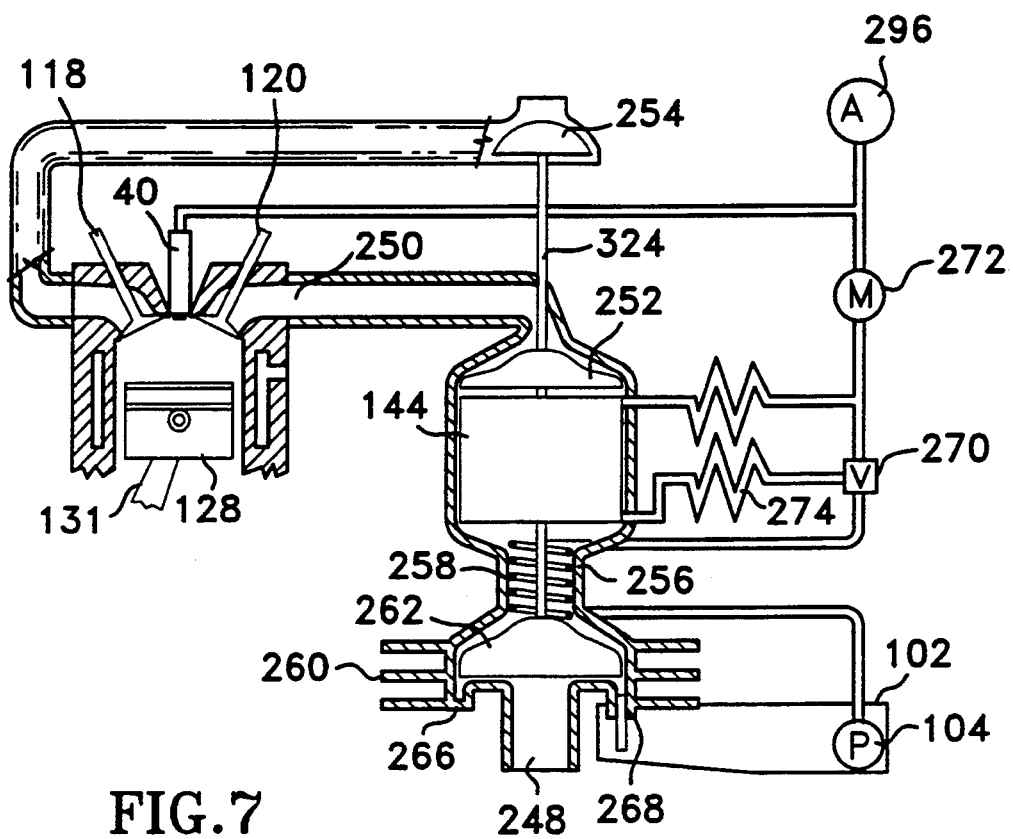
FIG. 7 is a schematic view of one embodiment of an apparatus utilized in accordance with the principles of the present invention for recovering energy and waste water from the exhaust stream of an internal combustion engine constructed in accordance with the principles of the present invention.
Figure 8:
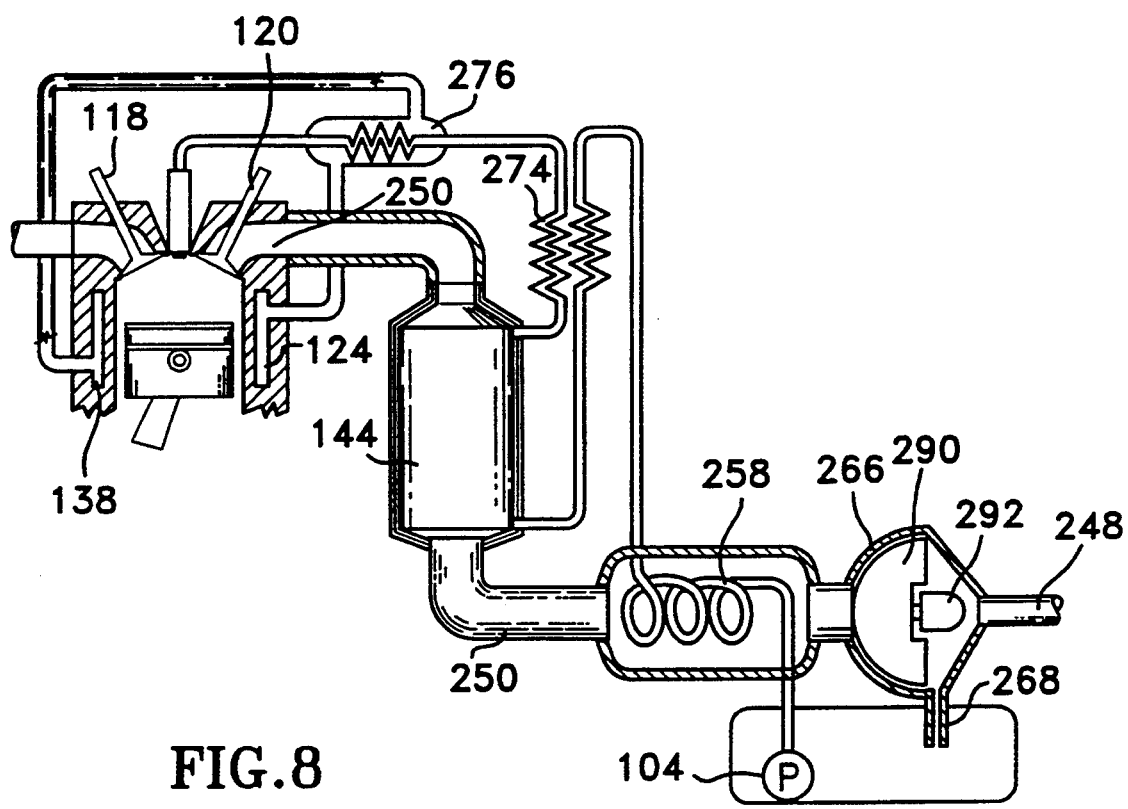
FIG. 8 shows a schematic view of another embodiment of an apparatus for recovering energy and waste water from the exhaust stream of an internal combustion engine.

It is anticipated that in certain applications, the embodiments of FIGS. 9 and 10 will be used in conjunction with the embodiments of FIGS. 7 or 8. The present invention assists virtually any fuel by improved combustion efficiency. The embodiments of FIGS. 10 and 11 can be used independently or in conjunction with standard fuel metering equipment such as diesel fuel injectors, carburetors, throttle body injectors, and port injectors.

Although it is generally preferred to burn all of the fuel on a stratified basis, it has been found that using hydrogen produced by the embodiment of FIG. 10 and delivered and ignited by the embodiment of FIG. 9 dramatically improves combustion efficiency of standard fuel metering systems in which conventional hydrocarbons are delivered by the standard fuel metering systems. This effect is valuable even at only 5 percent heat delivery from the hydrogen.

Fuels of particular importance for environmental protection include higher hydrogen-to-carbon ratio fuels such as renewable methane, methanol, ethanol, and hydrogen. Producing hydrogen for use as a combustion stimulant is especially helpful in reducing unwanted emissions of NOx, CO, and hydrocarbons.

Hydrogen burns in excess air to produce water vapor and very small amounts of $NO_x$. Worthy reductions in emissions of $NO_x$, $CO_2$, CO, $HC_x$, $SO_2$, and particulates are possible when hydrogen is used as a substitute for nearly any portion of gasoline and diesel fuel. Table 1 shows comparisons of emissions from vehicles using the invention with various percentages of hydrogen and other fuels. It shows that relatively small amounts of hydrogen can dramatically reduce exhaust emissions of atmospheric pollutants and achieve stringent exhaust emission limits. As shown in the test results of Table 1, ultimately clean exhaust conditions can be met by increasing the percentage of hydrogen.

Use of hydrogen as a cold-start, start-up, and pilot fuel for land-fill methane, natural gas, and sewer gas is encouraged. Conventional waste disposal practices that release large volumes of harmful greenhouse gases such as methane and carbon dioxide can be replaced by processes that collect renewable hydrogen and methane from land-fill and sewage treatment plants for use in the transportation system. Costly waste disposal practices that pollute the environment can become profit centers as clean-burning renewable hydrogen and methane are collected and marketed as renewable fuels that replace diesel and gasoline fuels.

Using hydrogen to stimulate complete combustion of hydrocarbon fuels increases the rate of molecular-cracking processes in which large hydrocarbons are broken into smaller fragments. Expediting production of smaller molecular fragments is beneficial in increasing the surface-to-volume ratio and consequent exposure to oxygen for completion of the combustion process. Improvements similar to those shown for methane-hydrogen mixtures are possible when hydrogen is used as a combustion stimulant with other hydrocarbons such as methanol, ethanol, gasoline, and diesel fuel. It is preferred to use 100 percent hydrogen on cold start, idle, and in polluted cities and to use the fossil fuel only as necessary to extend the range when in areas that are not as sensitive.

It thus will be understood that the objects of this invention have been fully and effectively accomplished. It will be realized, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

TABLE 1

| TEST OR STANDARD | EMISSIONS, GRAMS PER MILE | | |
|---|---|---|---|
| | RHC[1] | CO | $NO_x$ |
| 5% HYDROGEN, 95% METHANE[2] | 0.06 | 1.6 | 0.38 |
| 50% HYDROGEN, 50% METHANE[2] | 0.03 | 0.4 | 0.23 |
| 100% HYDROGEN[2] | 0.0 | 0.0 | 0.18 |
| CALIFORNIA TLEV[3] | 0.125 | 3.4 | 0.4 |
| CALIFORNIA LEV[4] | 0.075 | 3.4 | 0.2 |
| CALIFORNIA ULEV[5] | 0.040 | 1.7 | 0.2 |

NOTES:
[1] RHC = Reactive Hydrocarbons
[2] % Hydrogen injected through spark-injector 40
[3] Transitional Low Emission Vehicle (CARB)
[4] Low Emission Vehicle (CARB)
[5] Ultra Low Emission Vehicle (CARB)
CARB = California Air Resources Board

What is claimed is:

1. An internal combustion engine, said engine including:
   a fuel injector for directly injecting fuels selected from the group consisting of liquid hydrocarbons and gaseous fuels including methane and hydrogen into a combustion chamber of the engine, said fuel injector having sensing means located within an injector housing for sensing information from fuel injection and combustion chamber events selected from the group consisting of compression, fuel pressure, fuel flow period, ignition, combustion, expansion, exhaust, and intake; said engine further including control means for adjusting operation of said engine responsive to said sensed information.

2. A combustion engine as in claim 1 wherein said means for controlling is an adaptive controller for optimizing events selected from the group consisting of: minimization of oxides of nitrogen formation, thermal efficiency, power production, engine smoothness, and control of combustion temperature.

3. A combustion engine as in claim 1 wherein said sensing means is a piezoelectric transducer.

4. A combustion engine as in claim 1 wherein said sensing means is a fiber optic transducer to detect said events by transducer operations selected from the group consisting of: intensity, frequency, phase, and polarization.

5. A combustion engine as in claim 1 wherein said sensing means is a capacitance transducer.

6. A combustion engine as in claim 1 wherein said sensing means measures natural frequency of said events.

7. A combustion engine as in claim 1 wherein said fuel injector includes a suitable means for igniting fuel as it enters said combustion chamber.

* * * * *